United States Patent [19]

Murray

[11] 4,306,783

[45] Dec. 22, 1981

[54] SCATTERED-LIGHT IMAGING SYSTEM

[75] Inventor: Kenneth M. Murray, Falls Church, Va.

[73] Assignee: The United States of America as represented by the Secretary of the Navy, Washington, D.C.

[21] Appl. No.: 125,299

[22] Filed: Feb. 27, 1980

[51] Int. Cl.³ .............................................. G03B 21/00
[52] U.S. Cl. .................... 353/121; 353/122; 353/20
[58] Field of Search ............... 355/67; 353/34, 82, 353/121, 122, 20

[56] References Cited

U.S. PATENT DOCUMENTS

| | | | |
|---|---|---|---|
| Re. 20,748 | 6/1938 | Bocca | 353/20 |
| 2,641,963 | 6/1953 | Carter | 353/20 |
| 3,498,705 | 3/1970 | Ooue et al. | 353/20 |
| 3,658,415 | 4/1972 | Miles | 353/122 |
| 3,770,344 | 11/1973 | Fukushima | 353/82 |
| 3,787,117 | 1/1974 | Watkins | 353/20 |

FOREIGN PATENT DOCUMENTS 1144815 3/1969 United Kingdom .................. 353/82

*Primary Examiner*—John W. Shepperd
*Attorney, Agent, or Firm*—R. S. Sciascia; William T. Ellis; Melvin L. Crane

[57] ABSTRACT

A system and method of obtaining the maximum amount of information available in photographs or other objects in which the optical density is far below normal. The system makes use of an unconventional system of illumination combined with conventional projection imaging optics to form a real image of the object using only light scattered by the individual particles which form the object.

9 Claims, 4 Drawing Figures

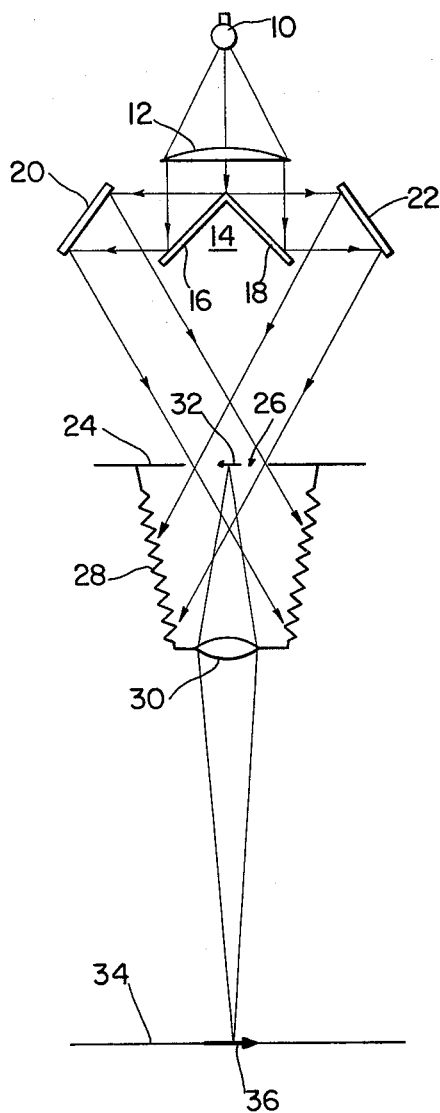
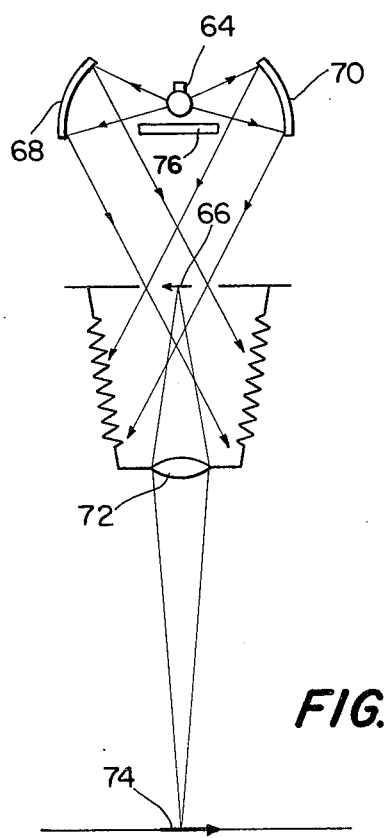
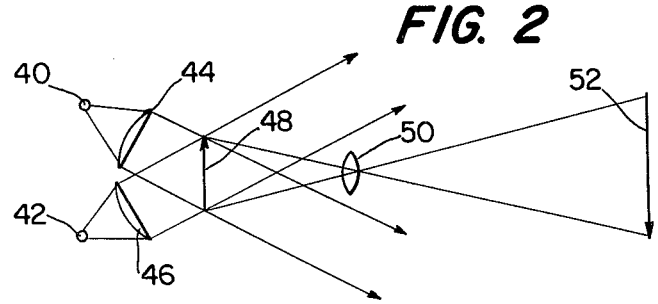
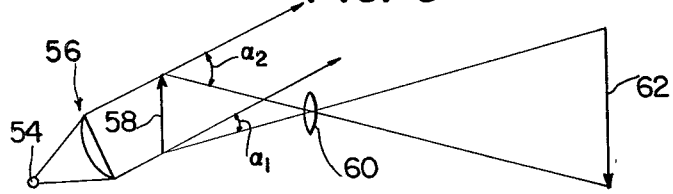
FIG. 1
FIG. 2
FIG. 3
FIG. 4

SCATTERED-LIGHT IMAGING SYSTEM

BACKGROUND OF THE INVENTION

This invention relates to imaging systems and more particularly to a system and method for forming images with a minimum lapse of contrast and for extracting information from grossly underexposed film where the little information that has been captured by the film is nearly lost in the noise, such as base fog.

It is well known that on occasion a photograph may be so grossly underexposed that desired information is not readily extractable from the photograph. In such a case, attempts at enhancing the contrast have been carried out by successive printings into very contrasted media. Such a process usually fails due to the inherent contrast losses in conventional printing systems. This technique does not achieve much success for optical densities less than about 0.1 above base fog. Optical density is defined at $\log_{10} I_O/I_T$ where $I_O$ is the incident intensity and $I_T$ is the transmitted intensity.

SUMMARY OF THE INVENTION

The method and device of this invention form images with a minimum of loss of contrast by illuminating the object with light directed at a small angle to the optic axis of the imaging system such that only light transmitted a deviated manner through the object is viewed by the imaging system. The real image formed by the system is formed only by light diffracted, refracted or scattered by the object. Light which is diffracted, refracted or scattered by particles of the object are focused by the imaging lens into bright points of light in the real image. This forms a reversal imaging system so that a reversal printing process must be used to make a normal positive print.

BRIEF DESCRIPTION OF THE DRAWINGS

FIG. 1 is a schematic drawing of a preferred scattered-light imaging system according to the invention.

FIGS. 2, 3, and 4 are modifications of the system of FIG. 1

DETAILED DESCRIPTION

FIG. 1 represents a schematic drawing of a preferred device. A point source of light 10 positioned on the axis of the device directs light through a condensing lens 12 which collimates the incident radiation. The collimated radiation is directed into a reflector or mirror system that reflects the radiation toward the object. The mirror system includes a beam splitter 14 formed by two fully reflective mirror surfaces 16 and 18 fixed at a 90° angle relative to each other and positioned with the vertex on the axis of the device. The mirror surfaces are at a 45-degree angle relative to the axis of the device. The radiation incident on mirror 16 is reflected onto a mirror 20 set at an angle such that the beam of light from mirror 16 will be directed so as to illuminate an aperture 26 located symmetrically about the axis. Mirror 18 reflected incident light to a mirror 22 which is set at an angle such that the beam of light from mirror 18 will be directed so as to illuminate an aperture 26 located symmetrically about the axis. The radiation incident on each respective mirror 20 and 22 is reflected toward the axis of the system so that the radiation is symmetrical with respect to that axis. A film holder 24 is provided with an aperture 26 symmetrically arranged about the axis. A bellows 28 coaxial with the axis of the device is secured at one end to the film holder and at the other end to a projection lens or focusing lens 30 in axial alignment such that the spacing between the film holder and the projection lens is adjustable. The radiation reflected from mirrors 20 and 22 is directed to an angle such that it passes through the aperture 26 and is absorbed by the inside surface of the bellows.

In operation of the above-described system an underexposed film or other transparency medium 32 to be imaged is placed onto the film holder 24 across the aperture 26 therein. The radiation reflected from mirrors 20 and 22 is incident on the film symmetrically from opposite sides. The result of symmetric illumination from each side is that the quasi linear nonuniform brightness of the light scattered from one direction adds to that from the other side to result in uniform brightness across the real image. Much of the radiation passes through the film and is incident on the walls of the bellows. Radiation incident on the particles of the film is diffracted, refracted or scattered by the particles on to the projection or focusing lens 30. The focusing lens focuses the radiation on its image plane 34 into bright points in the image. The dark areas in the film will appear as light areas in the image and the light areas appear dark in the image; hence this is known as a reversal imaging system. Since the radiation is incident on the film symmetrically, the illumination angles are substantially equal so that the brightness gradients will cancel and the image will appear uniformily bright at its focal plane.

The fact that this is a reversal system is advantageous in viewing photographic negatives or printing them with reversing systems such as Polaroid Film. The primary advantage in the above system is its ability to extract information from grossly underexposed film by forming images with a minimum loss of contrast.

Contrast is improved by limiting the direction of the light from the illuminating system to a small angle. The object is illuminated with well-collimated beams directed at an angle to the optical axis of the imaging lens. The cone of acceptance of the imaging lens is limited so that none of the undeviated transmitted light enters the lens. The imaging lens then focuses incident light which is diffracted, refracted or scattered by particles of the object into bright points in the image. The brightness of each point of light in the image is determined by the acceptance angle of the imaging lens.

Since it is desired to have the light come symmetrically from opposite sides of the object, two light sources 40 and 42 (see FIG. 2) may be used in combination with condenser lenses 44 and 46 which collimates the light and directs the light toward the object 48. The two lights and condenser lens may by used instead of one light source and a mirror system such as shown in FIG. 1. The two light sources and condenser lenses are positioned at an angle with respect to the axis of the device such that the light is incident upon the object which is perpendicular to the axis at an angle. The angle is such that the light by-passes and is not directed into the imaging lens 50. The image is formed on the image plane 52 such as described above for the device of FIG. 1.

A less efficient system is shown in FIG. 3. This system uses one light source 54 and a condensing lens 56 fixed to direct light onto an object 58 at an angle such that none of the directly transmitted light enters the imaging lens 60. In this system, the feathers of the arrow image 58 will be much brighter than the tip end because the scattering angle, $\alpha_1$, at the feather end of the object is smaller than the scattering angle $\alpha_2$ at the point. By keeping the difference in scattering angle from one end of the object to the other small, the brightness gradient across the image can be reduced. Symmetrically illuminated objects such as shown in FIGS. 1 and 2 overcome the problem of uneven brightness.

FIG. 4 illustrates a modification of the device shown in FIG. 1. This modification includes one point source of light 64 located on the axis of the device. The light source symetrically illuminates the object 66 by use of two off axis paraboloidal reflectors or mirrors 68 and 70. A baffle 76 is provided beneath light souce 64 to shield object, or transparency, 66 from direct radiation. The radiation is collimated by the paraboloidal reflectors and is at an angle with respect to the object on the axis. The reflectors are so positioned that the radiation is not reflected onto the projection lens 72. The image of the object is formed on the image plane 74 in the same manner as explained above for the device of FIG. 1. By using two paraboloids such as shown, the need for condensing lenses is eliminated.

Obviously many modifications and variations of the present invention are possible in view of the above teachings. It is therefore to be understood that within the scope of the appended claims the invention may be practiced otherwise than as specifically described.

What is claimed and desired to be secured by Letters Patent of the United States is:

1. A photographic image enhancement system comprising:
    an imaging means having an optic axis;
    an object holding means positioned on the optic axis and spaced from the imaging means for holding a transparency which has its surface normal to the optic axis and through which the optic axis passes and,
    means for illuminating the transparency;
    said illuminating means including means disposed laterally of the optic axis for directing optical radiation toward the transparency surface at an angle relative to the optic axis such that direct optical radiation by-passes the imaging means;
    whereby only deviated light having been diffracted, refracted, or scattered by the transparency is transmitted to the imaging means.

2. A system as claimed in claim 1 wherein the means for illuminating the transparency includes one light source in combination with a condensing lens.

3. A system as claimed in claim 1 wherein the means for illuminating the transparency includes two light sources each in combination with a condensing lens with the radiation from each light source directed onto said transparency.

4. A system as claimed in claim 1 wherein the means for illuminating the transparency includes a single light source, radiation reflecting means on opposite sides of the optical axis, and baffle means for shielding the imaging means from direct optical radiation of the light source.

5. A system as claimed in claim 4 wherein the radiation reflecting means includes a beam splitter and reflecting surfaces opposite the beam splitter.

6. A system as claimed in claim 1 wherein the means for illuminating the transparency includes at least two radiation reflecting surfaces configured to direct light from a single source onto the transparency, and means for shielding the imaging means from direct optical radiation of the illuminating means.

7. A system as claimed in claim 6 wherein the means for illuminating the transparency includes two paraoloidal radiation reflecting surfaces.

8. A method of obtaining the maximum amount of information available in a transparency in which the optical density is far below normal comprising:
    positioning the transparency in an optic axis of an imaging system with its surface normal to the optic axis;
    directing collimated light at an angle to the optic axis and through the transparency such that undeviated light by-passes the imaging system;
    focusing light which has been diffracted, refracted or scattered in passing through the transparency to form a real image.

9. The method according to claim 8 further defined by shielding the imaging system from direct light radiation.

* * * * *